United States Patent [19]

Sakai et al.

[11] 4,266,418

[45] May 12, 1981

[54] METHOD FOR MANUFACTURING A TAPER SPRING

[75] Inventors: Yoshihiro Sakai; Jun Takahashi, both of Yokohama, Japan

[73] Assignee: NHK Spring Co., Ltd., Yokohama, Japan

[21] Appl. No.: 49,176

[22] Filed: Jun. 18, 1979

[51] Int. Cl.³ .............................................. B21B 1/42
[52] U.S. Cl. ...................................... 72/197; 72/205; 72/240
[58] Field of Search ................. 72/191, 197, 205, 240, 72/190; 29/173

[56] References Cited

U.S. PATENT DOCUMENTS

| | | | |
|---|---|---|---|
| 2,995,050 | 8/1961 | Karron et al. | 72/205 |
| 3,301,032 | 1/1967 | Hirose | 72/197 |
| 3,820,373 | 6/1974 | Shiguma et al. | 72/240 |

Primary Examiner—Lowell A. Larson
Attorney, Agent, or Firm—Frishauf, Holtz, Goodman and Woodward

[57] ABSTRACT

A taper spring is manufactured by rolling which is achieved by a single-spindle planetary rolling mill having a shiftable upper roll and a planetary roll constructed by a main roll and a plurality of satellite rolls while applying predetermined longitudinal tension to a material by a drawing chuck located at the outlet side of the rolling mill and a pair of relatively movably feed rolls located at the inlet side of the rolling mill.

4 Claims, 8 Drawing Figures

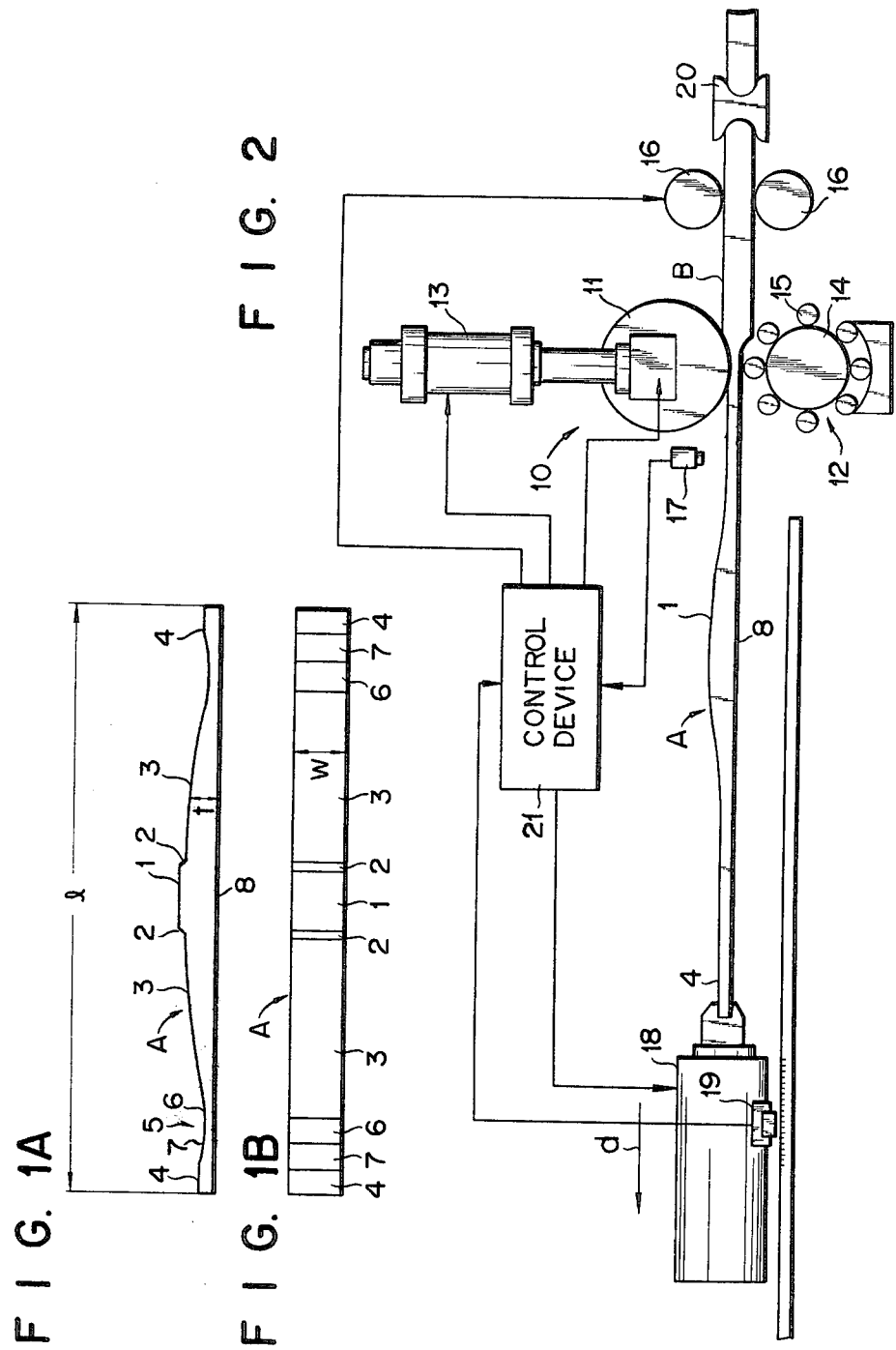

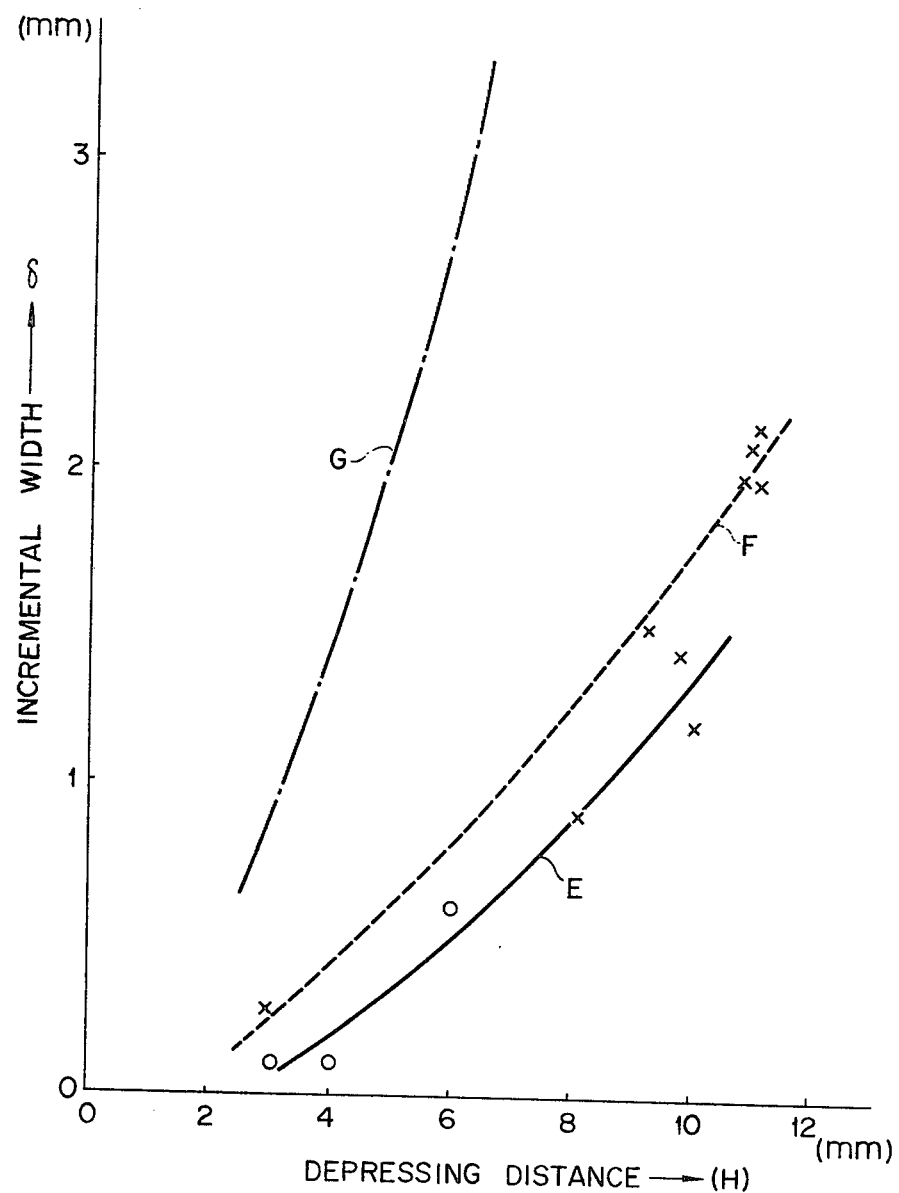

METHOD FOR MANUFACTURING A TAPER SPRING

BACKGROUND OF THE INVENTION

This invention relates to a method for manufacturing a taper spring such as a leaf spring used for a vehicle suspension apparatus.

The leaf spring of this type is so constructed that the central portion and end portions are coupled to the axle and car body sides, respectively, thereby sustaining load across the thickness of the spring. In order to make uniform the stress on parts along the longitudinal direction for the lightness of the car body, therefore, the leaf spring includes taper portions with their thicknesses varying along the length.

A taper spring A as illustrated in FIGS. 1A and 1B has a substantially fixed width w throughout its overall length l. Taper portions 3 are formed respectively on both longitudinal sides of a central flat portion 1 where thickness t is the greatest, first connecting portions 2 being interposed between the flat portion 1 and their corresponding taper portions 3. The taper portions 3 have their thickness t decreased toward each end portion, adjoined to somewhat thickened flat end portions 4 by second connecting portions 5. Each second connecting portion 5 includes a flat portion 6 with a minimum thickness and adjoining each corresponding taper portion 3 and a taper portion 7 thickened increasingly toward the end portion 4 and adjoining each corresponding flat portion 6 and end portion 4.

Although the taper spring A of the aforementioned construction may be formed also by cutting or forging, rolling is generally used in view of productivity and cost. However, in the method of rolling by means of a conventional two- or four-step rolling mill, the spring width is considerably increased by rolling, so that there is required another process for previously narrowing the spring width or cutting off waste portions after rolling. On the other hand, if small-diameter rolls are used for rolling to minimize the increase of the spring width, then the rolling frequency must be increased because of the rolls' limited depressing distance. Either way, the number of processes required would be increased to cause a reduction in productivity as well as an increase in cost.

SUMMARY OF THE INVENTION

Accordingly, the object of this invention is to provide a method for manufacturing a taper spring capable of efficiently rolling a taper spring of desired shape at a time without involving any substantial increase in the width of the spring.

A method for manufacturing a taper spring according to one aspect of the invention is characterized in that rolling is achieved by means of a planetary rolling mill while applying predetermined longitudinal tension to a material. The tension is applied by means located at the inlet and outlet ends of the planetary rolling mill.

BRIEF DESCRIPTION OF THE DRAWINGS

FIGS. 1A and 1B are side and plan views of an example of a conventional taper spring, respectively;

FIG. 2 is a schematic side view of an apparatus used for the method of manufacturing a taper spring according to an embodiment of this invention;

FIG. 4 shows the relationship between the depressing distance of an upper roll and the incremental width of the spring;

DETAILED DESCRIPTION

Now there will be described a method for manufacturing a taper spring according to an embodiment of this invention with reference to the accompanying drawings.

Figure 3:
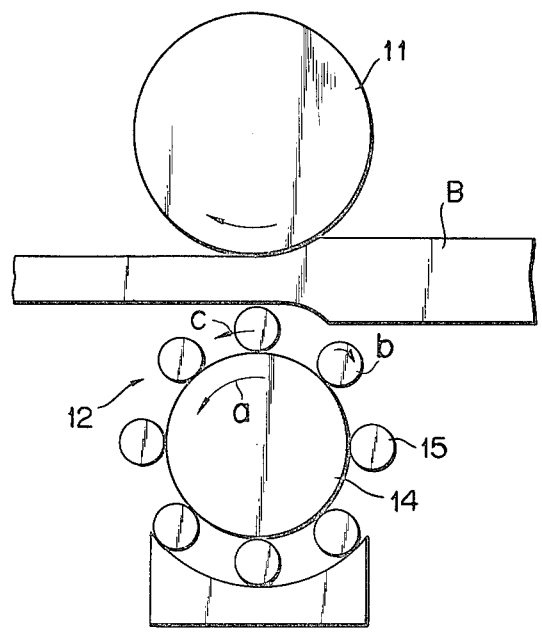
FIG. 3 is an enlarged schematic view of a planetary rolling mill of the apparatus of FIG. 2.

Referring now to FIG. 2, there is shown a single-spindle planetary rolling mill 10 of a conventional type which includes an upper roll 11 liftably mounted on a frame (not shown) and a rotatably supported planetary roll 12. The upper roll 11 is so constructed that its vertical position may be controlled by a lift 13 such as a hydraulic cylinder. The planetary roll 12 is comprised of a main roll 14 and a plurality of satellite rolls 15 arranged at regular intervals round the main roll 14. When the main roll 14 is rotated in the direction of arrow a, as shown in FIG. 3, the satellite rolls 15 in rotational contact with the main roll 14 turn on their own axes in the direction of arrow b and revolve round the main roll 14 in the direction of arrow c so as to roll a spring material B interposed between the satellite rolls 15 and the upper roll 11. On the supply side of the rolling mill 10 are a pair of feed rolls 16 in rotational contact with both sides of the material B across its thickness. On the drawing side of the rolling mill 10 are a detector 17 disposed in close vicinity to the upper roll 11 and a drawing chuck 18 capable of reciprocating along the transfer direction of a taper spring A.

The lift 13, main roll 11, feed rolls 16 and the drawing chuck 18 are so constructed as to be driven or controlled in accordance with control signals such as pulse signals delivered from a control device 21. The control device 21, including a microcomputer with suitable storing capability, is supplied with output signals of a position detecting means 19 for the drawing chuck 18 (e.g., a driving mechanism for driving the drawing chuck or a means attached to the chuck itself and producing pulse signals corresponding to the shifting distance) and the detector 17. The microcomputer stores data on the correlation between the length and thickness of the taper spring A, data on the characteristics of the rolling mill 10 (e.g., data on the correction of the lift of the upper roll 11 corresponding to the extension of the frame of the rolling mill and to the thermal expansion of the upper roll 11 and the planetary roll 12), data on the correction of the drawing distance accompanying the cooling of the taper spring during the rolling process, and other several data required and processing programs therefor. The microcomputer is so designed that the taper spring A may be automatically rolled in accordance with the aforesaid various detection data.

Now there will be described a method for rolling the taper spring A by means of the apparatus of the aforementioned construction.

The spring material B, which is a strip with a rectangular section of prescribed dimensions, is heated to a predetermined temperature in a heating furnace, and then held between the pair of feed rolls 16 and thereby sent pressurized to the rolling mill 10. In the rolling mill 10, the spring material B inserted between the upper roll 11 and the planetary rolls 12 from the supply side is rolled. When an end portion 4 of the rolled taper spring A has reached a predetermined position, the drawing chuck 18 clamps the end portion 4 in response to the output signal of the detector 17. Also in response to the output signal, the feed rolls 16 depress the material through such a depressing distance as to provide a predetermined tractive force. Further, the feed rolls 16 are allowed to rotate freely from the driving shaft by a one-way clutch or a electromagnetic clutch released in response to the same output signal. In this state, the drawing chuck 18 pulls the spring A in the direction of arrow d, so that the spring material B is subjected to predetermined longitudinal tension between the drawing chuck 18 and the feed rolls 16. Thus, taper rolling is started in accordance with the drawing speed of the drawing chuck 18.

In order to obtain the thickness required for the taper leaf spring, as shown in FIG. 1, the roll lift is given an order in accordance with a set gradient previously designated in the microcomputer on the basis of the output signal of the detecting means 19 for the drawing chuck shifting distance, so that the lift is moved correspondingly to rolled material lengths $l_1$, $l_2$ and $l_3$. Moreover, the previously found characteristics of the rolled material (thickness correction function based on the extension of the frame compared with the depressing distance, and correction functions of the roll diameter changes due to thermal expansion or the thermally contracted length attributable to the cooling of the rolled material) are stored in the microcomputer, thereby enabling entirely automatic correction.

In the rolling mill 10, the rolling operation is performed by the upper roll 11 and the small-diameter satellite rolls 15. Since the satellite rolls 15 are successively brought into rotational contact with the spring material B with a narrow depressing distance (i.e., spacing) per roll as well as with the short outside diameter of the rolls, the increase of the material width may be substantially reduced. Further, since the satellite rolls 15 are rotated in touch with the main roll 14 to be brought in a planetary motion, the taper spring A will never be transferred by the rolling operation. As stated above, however, the taper spring A is subjected to the predetermined tension through the drawing chuck 18, so that it is rolled and transferred in the longitudinal direction. Owing to the tension applied to the taper spring A, the increase of the material width is very limited as compared with the case where the spring material is thrust between the rolls 11 and 12 with no satellite rolls by means of the feed rolls 16.

Figure 5:
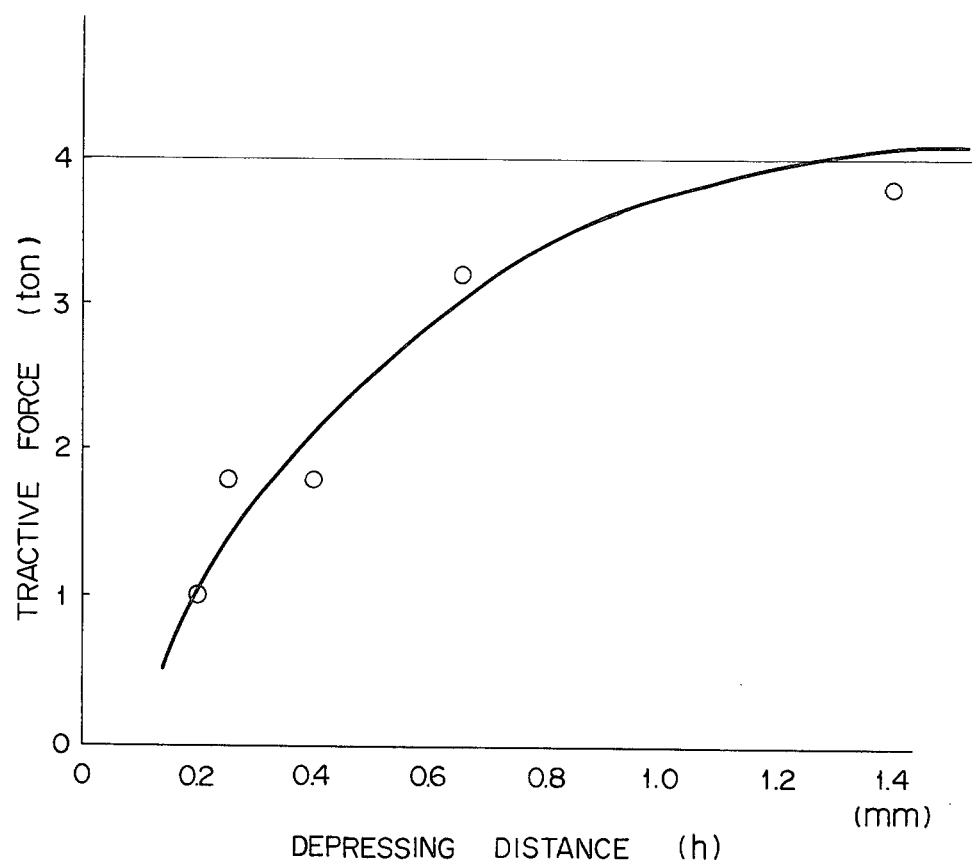
FIG. 5 shows the relationship between the depressing distance of the feed rolls (i.e., spacing between feed rolls) and the tractive force applied.

In FIG. 4, a full line E indicates a change of the incremental width of the spring material of 11 mm and 16 mm thicknesses with varying depressing distance H where the planetary roll is provided with 8 satellite rolls with an outside diameter of 60 mm, the outside diameter of the feed rolls is 205 mm, the speed at the outlet of the rolling mill is 10 m/min, and the tractive force is 3.8 to 4.4 tons. Here the depressing distance H is the difference between the original thickness of the spring material and the thickness at the outlet of the rolling mill, including the depressing distance (t) provided by the feed rolls 16. The depressing distance (t) of the feed rolls 16 has a relationship with the tractive force as shown in FIG. 5. The incremental width δ is the difference between the original width of the spring material and the width at the outlet of the rolling mill. Circles (O) and crosses (X) represent examples for the thicknesses of 11 mm and 16 mm, respectively.

In FIG. 4, a broken line F indicates similar data to those indicated by the line E according to the push system in which no tractive force is applied, while a chain line G represents data for the incremental width obtained in accordance with the conventional two-step roll push system.

As may be seen from the graph of FIG. 4, the incremental width δ for the depressing distance H of 6 mm is given as only about 0.5 mm according to the method of this invention (represented by full line E), whereas it is given respectively as about 3 mm and 0.8 mm according to the methods for reference (represented by chain line G and broken line F)—approximately 6 and 1.6 times the width provided by the method of this invention, respectively. The differences of the width between the method of the invention and the methods for reference will be further increased if the depressing distance H is set at 8 mm.

Figure 6A:
FIG. 6A is a sectional view of a taper spring formed by the method of the illustrated embodiment, provided the tractive force is not applied.
Figure 6B:
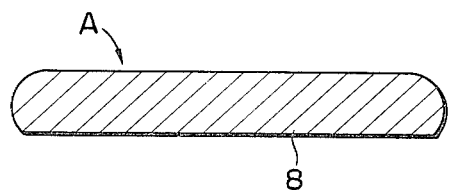
FIG. 6B is a sectional view of a taper spring formed by the method of the illustrated embodiment.

The taper spring A rolled by the planetary roll method has a sharp-edged bottom 8 on the planetary roll side, as shown in the sectional view of FIG. 6A. If tractive force is applied in rolling, then the sharpness of the edges will be reduced as shown in FIG. 6B. Thus, the fatigue resistance of the spring will be improved as compared with the case of the planetary roll method using no tractive force.

Since the vertical position of the upper roll 11 can be automatically controlled in connection with the shifting distance of the drawing chuck 18, thereby automatically correcting influences of distortions of several parts, a desired taper spring with correct shape and dimensions may be produced efficiently.

In an initial state for the start of rolling on a rolling mill 10, the spring material B is held between the feed rolls without being subjected to the tensile force of the drawing chuck 18, and thereby inserted into the rolling mill 10. Accordingly, the incremental width of a portion of the taper spring rolled at the initial state will be relatively large. In order to prevent this for the improvement of product yield, there are provided a pair of edge rolls 20 on the supply side of the rolling mill 10 and in rotational contact with both transverse sides of the spring material B, as shown in FIG. 2. It is to be desired that the end portion of the spring material B should previously be formed narrow by suitably setting the space between the edge rolls 20. Moreover, the space between the edge rolls 20 may conveniently be controlled in accordance with the control signal delivered from the control device.

What we claim is:

1. In a method of manufacturing a taper spring by rolling a material at varied rolling thicknesses, the improvement comprising:

applying a predetermined longitudinal tension to said material being rolled by drawing said material in the rolling direction by a drawing means located at the outlet side of a rolling mill and passing said material through a pair of relatively movable feed rolls located at the inlet side of said rolling mill, said feed rolls being relatively movable toward and away from each other to press against said material with a force which is a function of said predetermined tension; and rolling said material by means of a planetary rolling mill while said predetermined longitudinal tension is being applied, said planetary rolling mill being located between said means and said feed rolls.

2. The method of claim 1, wherein said planetary rolling mill includes a vertically movable upper roll, a main roll facing said upper roll, and a plurality of satellite rolls arranged around said main roll.

3. The method of claim 2, wherein said planetary rolling mill comprises at least eight of said satellite rolls arranged around said main roll.

4. The method of claim 1 or 2, comprising disposing a pair of edge rolls at the inlet side of said rolling mill, said edge rolls being pressed respectively by both sides of said material, thereby defining the width of said material being rolled.

* * * * *